Figure 1:
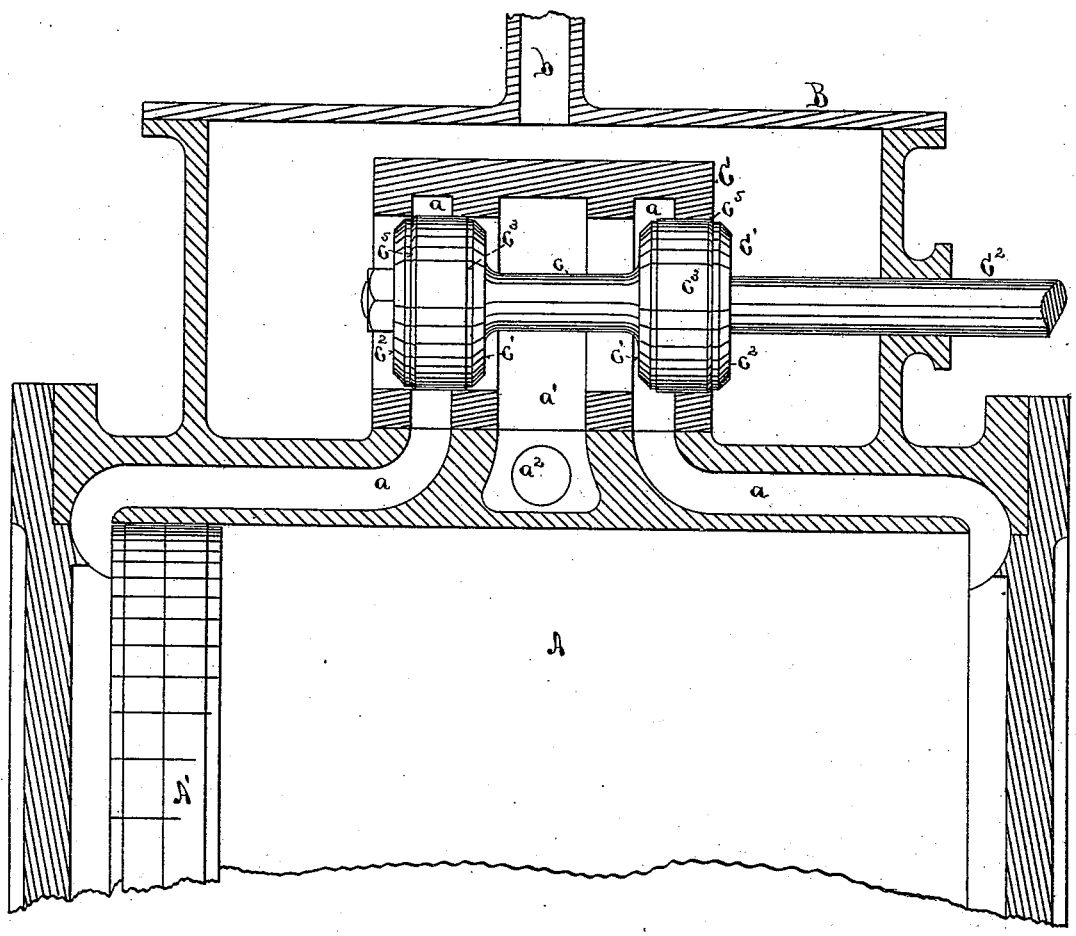

(No Model.)  5 Sheets—Sheet 1.

D. H. RICE.
STEAM PISTON AND VALVE PACKING.

No. 355,950. Patented Jan. 11, 1887.

Witnesses
Wm. B. Brown
N. P. Ockington

Inventor
David Hall Rice (No Model.) 5 Sheets—Sheet 2.
D. H. RICE.
STEAM PISTON AND VALVE PACKING.
No. 355,950. Patented Jan. 11, 1887.
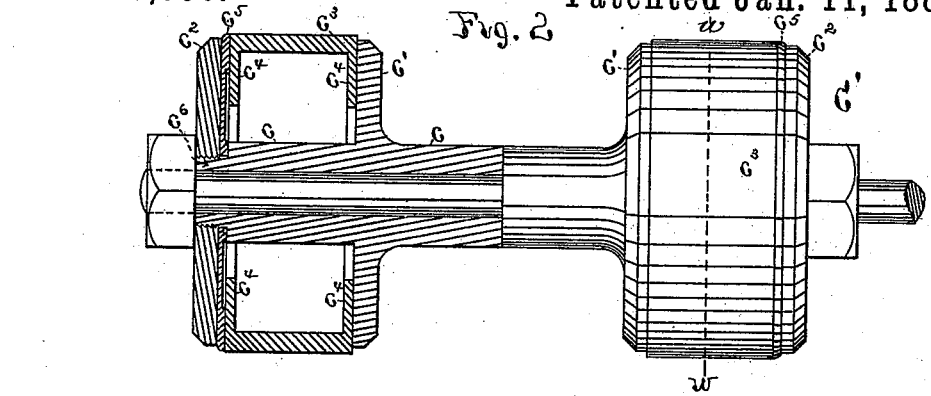
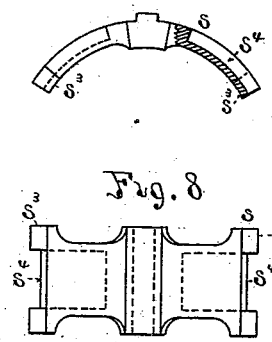
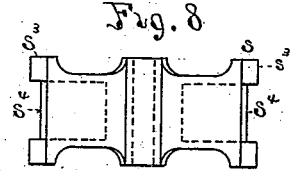
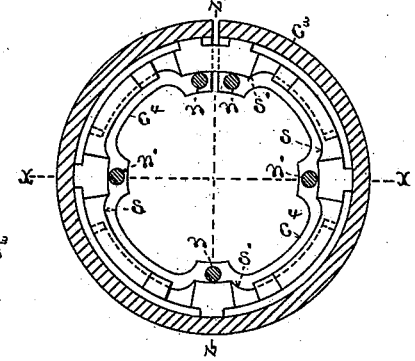
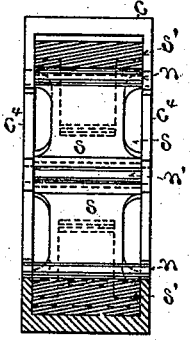
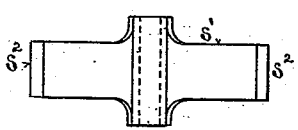
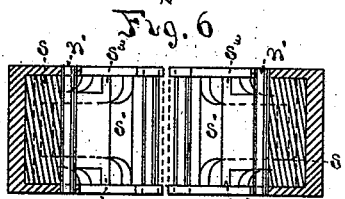
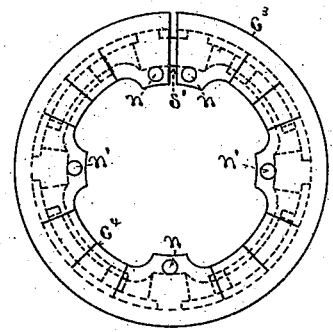
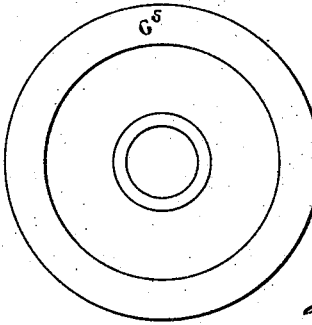
Witnesses
Wm. S. Brown
N. P. Ockington
Inventor
David Hall Rice (No Model.) 5 Sheets—Sheet 3.
D. H. RICE.
STEAM PISTON AND VALVE PACKING.
No. 355,950. Patented Jan. 11, 1887.
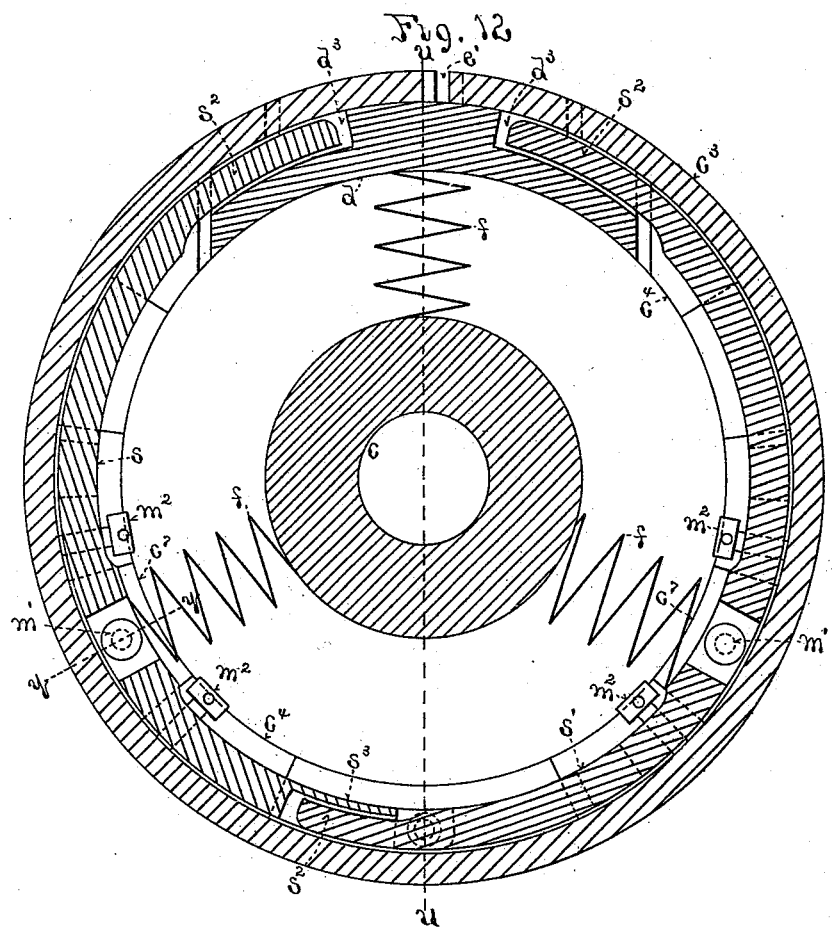
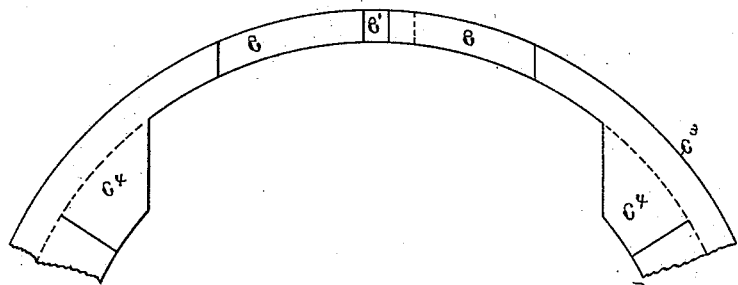
Witnesses
Wm. S. Brown
N. P. Ockington.
Inventor
David Hall Rice (No Model.) 5 Sheets—Sheet 4.
D. H. RICE.
STEAM PISTON AND VALVE PACKING.
No. 355,950. Patented Jan. 11, 1887.
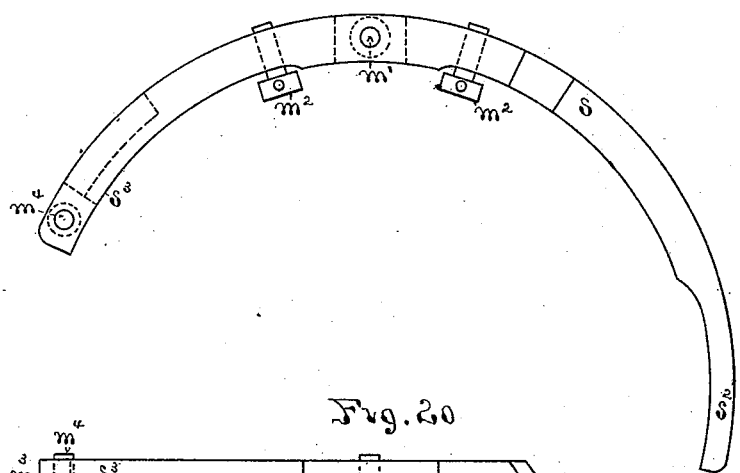
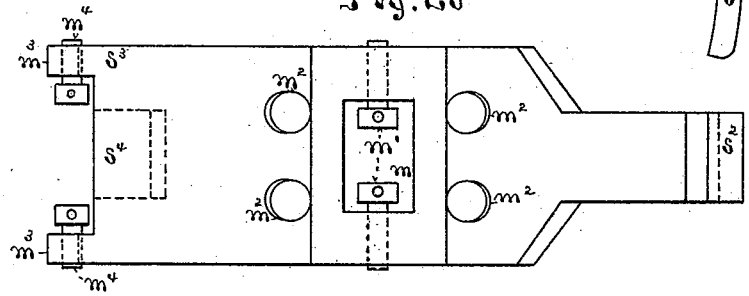
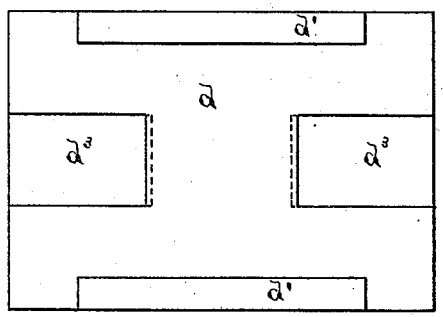
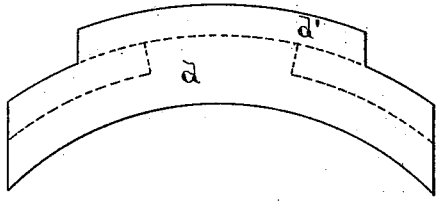

(No Model.) 5 Sheets—Sheet 5.
D. H. RICE.
STEAM PISTON AND VALVE PACKING.
No. 355,950. Patented Jan. 11, 1887.
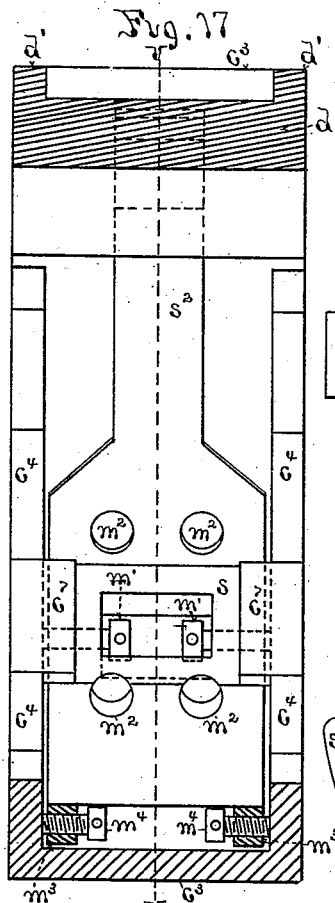
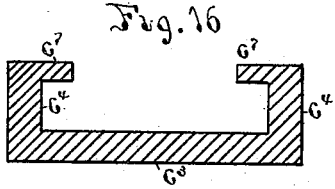
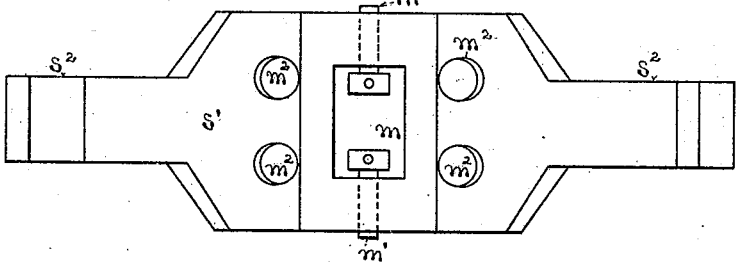
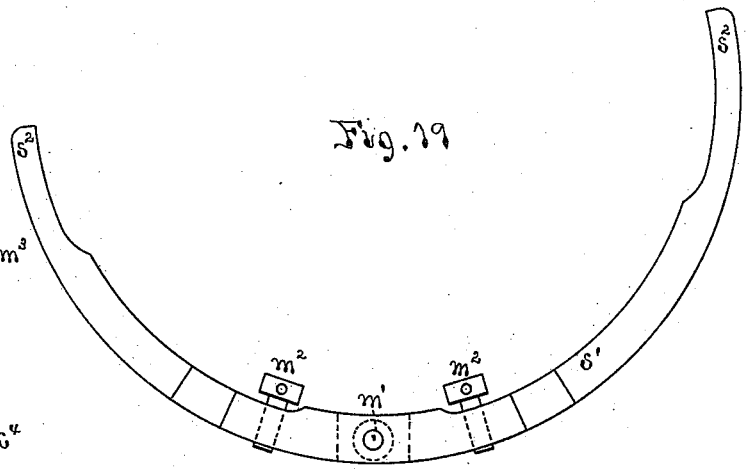
Witnesses
Wm. S. Brown
N. P. Ockington.
Inventor
David Hall Rice

UNITED STATES PATENT OFFICE.

DAVID HALL RICE, OF BROOKLINE, ASSIGNOR TO JAMES FERGUSON, OF BRIDGEWATER, MASSACHUSETTS.

STEAM PISTON AND VALVE PACKING.

SPECIFICATION forming part of Letters Patent No. 355,950, dated January 11, 1887.

Application filed October 11, 1886. Serial No. 215,856. (No model.)

*To all whom it may concern:*

Be it known that I, DAVID HALL RICE, of Brookline, in the county of Norfolk and State of Massachusetts, have invented a certain new and useful Improvement in Steam Piston and Valve Packings, of which the following is a specification.

My improvement relates to steam-pistons and packings for valves and cylinders for engines; and it consists in certain improved constructions and combinations of the same, substantially as hereinafter described and claimed.

In the drawings, Figure 1 is a longitudinal vertical section of a portion of a steam-engine cylinder with the steam-chest and piston-valve connected therewith provided with my invention. Fig. 2 is an enlarged view of the valve-piston, partly in section, showing the outer packing-ring and my elastic packing-diaphragm applied thereto. Fig. 3 is a side view of the elastic packing-diaphragm detached from the valve-piston. Fig. 4 is a side view of the packing-ring detached from the valve-piston and having connected with it my improved mechanism for preventing its expansion unequally on its opposite sides or edges, as hereinafter explained. Fig. 5 is a central section of the ring on the line $w\,w$ of Fig. 2. Fig. 6 is a transverse section through the axis of the ring on line $x\,x$ of Fig. 5. Fig. 7 is a transverse section through the axis of the ring on line $z\,z$ of Fig. 5. Figs. 8, 9, 10, and 11 are views of the detached segments which are used within the packing-ring, as shown in Figs. 4, 5, 6, and 7, to prevent the unequal expansion of the opposite sides or edges of the ring. Fig. 12 is a section of the ring on line $v\,v$ of Fig. 17. Fig. 13 is a side view of a portion of the ring shown in Fig. 12, immediately adjacent to the joint or division in the ring. Fig. 14 is an outer face view of the segment detached, which is used for breaking the joint of the packing-ring. Fig. 15 is an edge view of Fig. 14. Fig. 16 is a transverse section of the packing-ring upon line $y\,y$ of Fig. 12. Fig. 17 is a transverse section of the packing-ring and the parts connected thereto upon line $u\,u$ of Fig. 12. Fig. 18 is an inside face view of the modified form of one of the segments shown in Fig. 12. Fig. 19 is an edge view of the same. Fig. 20 is an inside face view of another of the segments shown in Fig. 12. Fig. 21 is an edge view of the same.

A is the steam-engine cylinder having the piston-head A' and steam-ports $a\,a$.

B is the steam-chest, connected to the boiler by the pipe $b$, which is provided with a suitable throttle-valve (in the part not shown,) for admitting steam to the steam-chest.

C is the valve-cylinder, which is placed within the steam-chest and around which the steam flows to reach the valve.

C' is the valve in the form of a piston, with two heads and a stem or neck connecting them together.

$C^2$ is the piston-rod passing through the valve and outward through the side of the steam-chest B, by which the valve is moved back and forth in its cylinder.

The valve-cylinder C has the steam-passages $a\,a$, extending around the heads of the valve C', and affording passages for the admission of the steam all around the valve-heads. The valve-cylinder C is also provided with an exhaust-passage, $a'$, between the steam-passages $a\,a$, which leads to a pipe, $a^2$, delivering the exhaust-steam into space. This valve-cylinder, steam-chest, and engine-cylinder are constructed substantially as shown and described in the Patent No. 335,571, granted to James Ferguson, February 9, 1886; but one or more struts may be used to bridge the steam-passages $a\,a$ or exhaust-passage $a'$, for the packing-ring to bear upon, if desired. Such struts should, however, be placed in such a position as not to interfere with the free passage of the steam out of or into the steam-passages $a\,a$.

My improvements relate to the manner of arranging and securing the packing-rings in the heads of the valve C', so that they shall be rendered steam-tight, and so that they shall be prevented from expanding on the edge which passes across the steam-passage $a$, or enters the exhaust-passage $a'$ in advance of the other edge, and thereby cutting away the valve-cylinder C or any strut used to bridge the passages $a$ or $a'$.

The valve C' is formed of a central stem, $c$, having flanges $c'\,c'$ attached to it, and a follower, $c^2$, screwed upon the outer end of the stem $c$, to confine the packing-ring $c^3$ between it and the flange $c'$ in each head of the valve. This packing-ring $c^3$ is made of a single wide band of steel having inwardly-projecting annular flanges $c^4$ $c^4$ on each side to form a wide bearing upon each radial face of the ring. These flanges $c^4$ $c^4$ are cut or sawed transversely and radially across at intervals to allow the ring to expand and contract. The ring is compressed or shut together around the valve-stem, having a slot on one side, and squeezed into the valve-cylinder, and is made to expand by its elasticity to form a steam-tight joint in the latter; or it may have springs placed within it to expand it, if desired.

In order to form a steam-tight packing against the edge of the ring $c^3$, against which the live steam would come around the outside of the follower $c^2$ in the use of the valve, I employ an elastic diaphragm, $c^5$, Fig. 3, between the follower $c^2$ and the ring $c^3$. This diaphragm is fitted to slip on over the end of the stem $c$ of the valve, upon which the follower $c^2$ is screwed. This end of the neck of the valve is reduced in diameter, as shown at $c^6$, so as to form an annular shoulder around the hole through the elastic diaphragm, between which shoulder and the follower $c^2$ the inner portion of the elastic diaphragm around the hole through it is clamped solidly with a steam-tight joint when the follower is screwed up. The outer face of the elastic diaphragm $c^5$, which fits against the face of the packing-ring $c^3$, is ground, to form a steam-tight joint, and the intermediate portion of it around where it is clamped to the valve-stem $c$, as described, is sufficiently elastic to allow it to yield toward the packing-ring by the pressure of the steam upon that portion of it which is exposed outside of the follower $c^2$. This steam-pressure upon the exposed portion of the elastic diaphragm $c^5$ keeps it closed against the packing-ring with a steam-tight joint all around as it or the ring wears away, since whatever steam enters between the elastic diaphragm and the follower will only cause the former to fit closer to the packing-ring $c^3$, as the steam cannot escape through the steam-tight joint at the center of the elastic diaphragm. The elastic diaphragm $c^5$ is made of the same size as the packing-ring $c^3$ when fitted to the bore of the valve-cylinder C, and it therefore closes the seam or joint in the packing-ring and prevents the entrance of steam through the same.

If the packing-ring $c^3$ in its use wears away the cylinder C inside and becomes larger, the follower $c^2$ may be removed and a larger elastic diaphragm, $c^5$, substituted for the one before used, so as to fill the enlarged bore of the valve-cylinder and keep the packing-ring steam-tight, whenever desired.

The amount of surface around the elastic diaphragm $c^5$ outside of the follower $c^2$, which is exposed to the pressure of the live steam in the steam-chest, may be regulated by increasing or diminishing the diameter of the follower, so as to cause the elastic diaphragm to press against the packing-ring sufficiently to preserve a steam-tight joint against it without compressing it so hard that the packing-ring cannot expand automatically and fill the bore of the valve-cylinder.

The thickness of the elastic diaphragm $c^5$, which will permit it to be compressed against the packing-ring, as described, will be readily found by experiment, as in the drawing Fig. 2 it is shown proportionately thicker than would be used for the exposed surface there shown, for the sake of clearness in the illustration. It may be made of thin steel or other similar material.

In the use of piston-valves having the steam and exhaust passages surrounding them, substantially as hereinbefore described, either entirely or to a considerable extent, a difficulty has been experienced from the liability of one edge or side of the packing-ring $c^3$ to expand outward into the steam-passages as it traverses across them, while the other side or edge of the ring is still held in the continuous portion of the bore of the valve-cylinder C, and the greater the expansive capacity of the packing-ring the greater the liability of its unequal expansion, as described, in passing over the steam-passages. This expansion of one edge or side of the packing-ring causes it to cut into the bore of the valve-cylinder on the side of the steam-passage $a$ toward which it is moving, and when so cut into, adjacent to the steam-passage on that side, which cutting will be in the form of a funnel opening toward the steam-passage, the bore of the cylinder allows a still greater unequal expansion of the packing-ring in moving in the opposite direction. In other words, the cutting action of the ring upon the bore increases the unequal expansion and aggravates the difficulty. To obviate this I introduce into the packing-ring one or more segments of metal, $s$ $s'$, so secured in the packing-ring as to allow of its expansion equally outward in all parts of its face, under either the elasticity of the ring or springs within it, but so attached to the ring as to prevent one side or edge of it from expanding outward while the opposite side or edge is confined within the bore of the cylinder and prevent it from expanding. These segments $s$ $s'$ are made to correspond in their internal form very nearly with that of the ring when the latter is compressed within the bore of the cylinder equally on both edges.

As constructed, as shown in Figs. 5 to 11 of the drawings, the segments $s'$ are made to lap past and fit into the segments $s$; but the segments $s$ may be used without the others lapping past them, if desired. The segments $s$ $s'$ are first introduced into the ring $c^3$ on opposite sides thereof, and are confined therein by having pins $n$ $n$ driven through the opposite flanges $c^4$ of the ring, and secured firmly therein, so as to confine the central portion of each segment snugly against the inner face of the ring and between the flanges $c^4$ on each side. The ends $s^2$ of the segments $s'$ are left free, and project in the form of legs each way from the confining-pins $n$. In the legs $s^3\,s^3$ of each segment $s$ are cut slots $s^4$ circumferentially around the segment, which the legs $s^2$ of the segments $s'$ fit into accurately and so as to be capable of sliding back and forth therein. The legs $s^3\,s^3$ of each segment $s$ are made of such a breadth as to fit snugly between the opposite flanges $c^4\,c^4$ of the ring when inserted in place in it, as shown in Fig. 6, and they are inserted in place so as to fit over the legs $s^2\,s^2$ of the segments $s'$, and are confined in place by other pins, $n'\,n'$, similar to pins $n$. The important feature in the fitting of these segments is that the central portion of the segment shall be held between its pin $n$ or $n'$ closely against the internal circumference of the packing-ring $c^3$, and that the ends of each of the segments shall have a sidewise bearing snugly against the opposite flanges $c^4\,c^4$ of the packing-ring. This closeness of fit of the legs of the segments $s$ against the opposite flanges is accomplished by bringing them to bear directly against the flanges $c^4\,c^4$, and is accomplished in the legs of the segments $s'$ by fitting them into the slots $s^4\,s^4$ of the segments $s$, so that they shall be free from sidewise movement therein.

On the side of the packing-ring $c^3$ which is cut to allow it to expand, two pins, $n\,n$, are used on each side of the slot to confine the segment there located in place. The function of these pins is accomplished by so fitting them that they and the ring may move along circumferentially on the segment as the ring expands. If, now, one edge of the packing-ring $c^3$, after it is in place in the valve, be confined within the bore of the cylinder C for even a very slight distance across the exposed surface of the ring and the opposite edge of the ring and remainder of its surface be left without any confining agent around it, it will be found to be impossible for the ring to expand upon this unconfined edge, for the twisting motion caused by the tendency to expansion of one edge of the ring while the other is so confined tends to carry the central part of each segment with it, because the central part of each segment is confined to the ring. This twisting motion upon the central portion of each segment presses its legs against the face of the flange $c^4$ on the unconfined side of the packing-ring the movement of the legs in this direction being greater in proportion as they are longer. Since the legs are already fitted snugly at their ends between these flanges, very near the point of junction of the flanges with the ring, they are incapable of motion in this direction, and hence they resist the twisting motion of the ring from the expansive pressure of its unconfined edge and prevent it from expanding on that edge. If, however, both edges of the ring be left unconfined there will be no twisting motion upon the segments $s\,s'$, and their legs will slide freely upon each other and permit of the equal expansion radially outward of all parts of the packing-ring. The segments $s\,s'$ are shown as lapped by each other, for the purpose of increasing the length of their legs and so increasing their power to resist the unequal expansion of the edges of the packing-ring, as before described; but they may be made to have the ends of their legs merely abut against each other and perform the functions as before described, but in such case each of them must have the ends of its legs fitted snugly within the flanges $c^4\,c^4$ of the packing-ring in the same manner as each segment $s$ is fitted.

It is evident that each segment, with its confining-pin $n$ or $n'$, acts at the point of confinement upon the packing-ring as an outside stationary bar or strut would, to keep the ring from expanding unequally on its edges at that point, and that such action is independent of the action of each of the other segments at the points where they are confined by their pins; hence one segment may be used alone or in conjunction with the others; but in cases where the ring is to pass over one of the passages $a$, so constructed as to leave it entirely unconfined all around it, I prefer to use at least three of the segments placed at equal distances around the inner circumference of the ring, so as to prevent its expansion on all sides. It will be evident that the segments so constructed at their central portions in the packing-ring are superior to stationary bars or struts outside of it, in not being subject to any appreciable wear in the use of the valve, as stationary struts or bars placed on the outside would be; and they may, therefore, be employed, even when such stationary struts or bars are used, to prevent the expansion of the ring against the latter from either wearing away the struts or cutting into the ring.

In Figs. 12 to 21 I have shown a modification in the construction of the segments $s\,s'$, in providing them with set-screws to fit them to the interior of the packing-ring and so avoid the nicety of construction requisite in the mechanism hereinbefore described, in order to avoid backlash in any part, which would give the packing ring room to expand before the segments came into action. I have also shown the segments as adapted to be used with a ring having the cut or seam in it covered by a lapping piece, which forms a steam-tight joint, and may be employed without the elastic diaphragm $c^5$, hereinbefore described.

The ring $c^3$, Figs. 12, 13, 14, 15, has a portion of its flange $c^4$ cut away, and a slot, $e$, cut of about the thickness of such flange in each edge on both sides of the division or cut $e'$, which is made through the ring in order to allow it to expand outward. A segmental piece, $d$, is made to fit upon the internal circumference of the ring between the cut-away parts of the flange $c^4$, its opposite edges being in the same planes with the edges of the packing-ring. This segmental piece also has radial flanges $d'\,d'$ on each side to fill the slots $e$ when it is inserted in place in the ring. This construction is well known, and will be understood by reference to Figs. 12, 13, 14, 15, without further description, the purpose being to form a steam-tight joint at the cut or division $e'$ in the ring and prevent the entrance of steam as the ring expands. This ring is intended to be used with a strut bridging the steam-passage $a$ in that part where the slot $e'$ in the packing-ring traverses back and forth, thereby keeping the slot at all times covered from the access of steam. The covering-piece $d$ has formed in it two slots, $d^3$ $d^3$, circumferentially around it, as shown. The segment $s$ has one of its legs, $s^2$, formed substantially as the legs $s^2$ of the segment $s'$, before described, and so as to fit snugly into transversely and slide circumferentially in one of the slots $d^3$ of the covering-piece $d$. The other leg, $s^3$, of this segment has a slot, $s^4$, to receive the corresponding leg of the other segment, as before described.

Instead of using pins to confine the central portions of the segments in the packing-ring, I form the flanges $c^4$ of the latter at that point with internally-projecting lips $c^7$, which will overlap the edges of the segments on each side. The segment $s'$ is made substantially as before described, one end of it being fitted to enter its corresponding slot, $s^4$, in the segment $s$, and the other end of it to enter its corresponding slot, $d^3$, in the covering-piece $d$. Through the central portion of each of the segments $s$ $s'$, I form a slot, $m$, and transversely of the segment each way within this slot I tap out a hole reaching to its edge. In these holes I insert set-screws $m'$ $m'$, with their points outward and heads in the slot $m$. On each side of slot $m$, I tap out holes in the segment and insert set-screws $m^2$ $m^2$, with their points projecting radially outward. The end of the leg $s^3$ of segment $s$ carries upon it two ears, $m^3$ $m^3$, in which are inserted set-screws $m^4$ $m^4$, with their points projecting through the edges of the legs transversely of the segment.

The segments $s$ $s'$ are first slipped into place in the ring, with their central parts under the lips $c^7$ $c^7$, and the leg $s^2$ of one in the slot $s^4$ of the other. The covering-piece $d$ is next inserted in place with the legs $s^2$ $s^2$ of the segments fitting into its slots $d^3$ $d^3$. When the parts are properly aligned, so that they can move circumferentially upon each other, by the setting out of the set-screws $m'$ $m'$ of the segments the set-screws $m^2$ $m^2$ of each segment are set up, binding it firmly under the lips $c^7$ $c^7$, and the set-screws $m^4$ $m^4$ are also set up, fitting the leg $s^3$ of the segments tightly between the flanges $c^4$ $c^4$ of the packing-ring, and it will be found that the segments will resist any unequal expansion of the ring, as before described, it being of course understood that the strut confining the exterior of the ring across the slot $e'$ acts conjointly with the segments $s$ $s'$ in forming the third point of support against the expansion of the ring. The use of the set-screws $m^4$ $m^4$ prevents the necessity of fitting the segments $s$ $s'$ so accurately to the interior of the ring, and it also enables the segments to be secured in place in the ring very readily and without any play between the parts which would impair the efficiency of the segments.

It will be observed that the flanges $c^4$ $c^4$ are efficient in co-operating with the segments to resist expansion only in those parts of them which are opposite to the ends of the segments, and that the parts of the flanges which are opposite to the ends of the segments and resist the sidewise movement of the latter might be connected with or form a part of the followers or flanges which confine the ring between them within the head of the valve, and still operate substantially as when they are connected to the ring itself, although I prefer the latter construction. The principle on which these flanges operate is that of resisting the sidewise movement of the legs of the segments. It is of course understood that the segments $s$ $s'$ shall be made of a sufficient rigidity to resist springing under the strain put upon them, and that in practice such proportions will be given to them as will insure this, as upon it will depend their capacity to confine the ring from unequal expansion. When springs are used to expand the ring in connection with these segments, they are arranged as shown in Fig. 12, so that the springs $f$ $f$ shall bear against the portion of each segment which is confined or attached to the ring $c^3$, pressing outward from the central stem, $c$. This permits of the springs acting upon the ring $c^3$ and its covering-piece $d$ without interfering with the action of the segments, as before described.

What I claim as new and of my invention is—

1. In a valve or piston head, the combination of the flange $c'$, the stem $c$, the expansion packing-ring $c^3$, the follower $c^2$, and the elastic diaphragm $c^5$, secured to the stem by a steam-tight joint at its center, and taking a bearing against the packing-ring upon the inner face thereof, around its circumference, substantially as described.

2. The combination of the expansion packing-ring $c^3$ and one or more segmental pieces, $s$, secured to the packing-ring internally in a radial direction at one part thereof and having one or both legs thereof bearing laterally against the flanges $c^4$ $c^4$, substantially as described.

3. The combination of the expansion packing-ring $c^3$ and the segmental pieces $s$ $s'$, each of which is secured to the packing-ring internally in a radial direction at one part thereof, and having the legs of said segments lapping past each other circumferentially and taking a bearing laterally against the flanges $c^4$ $c^4$, substantially as described.

4. The combination of the expansion packing-ring $c^3$, the covering-piece $d$, provided with slots $d^3$ $d^3$, and the segments $s$ $s'$, each secured to the packing-ring internally in a radial direction at one part thereof and having their legs $s^2$ fitted to and taking a bearing laterally in said slots $d^3$ $d^3$, substantially as described.

5. The combination of the expansion packing-ring $c^3$, the segment $s$, secured to the packing-ring internally in a radial direction at one part thereof and having its leg $s^3$ provided with set-screws $m^4 m^4$, adapted to bear laterally against the flanges $c^4 c^4$, substantially as described.

6. The combination of the expansion packing-ring $c^3$, provided with flanges $c^4 c^4$ and lips $c^7 c^7$, and the segment $s$, provided with one or more set-screws, $m^2$, adapted to bind said segment against said lips, and with set-screws $m^4 m^4$ upon the leg thereof, adapted to bear against said flanges laterally, substantially as described.

7. The combination of the expansion packing-ring $c^3$, provided with flanges $c^4 c^4$ and lips $c^7 c^7$, the segment $s$, provided with one or more set-screws, $m^2$, adapted to bind said segment against said lips, and with set-screws $m^4 m^4$ upon the leg thereof, adapted to bear against said flanges laterally, and with the slot $s^4$ and the segment $s'$, provided with one or more set-screws, $m^2$, adapted to bind said segment against said lips, and with a leg, $s^2$, adapted to fit and take a lateral bearing in the slot $s^4$, substantially as described.

8. The combination of the expansion packing-ring $c^3$, provided with flanges $c^4 c^4$ and lips $c^7 c^7$, the segment $s$, provided with adjusting set-screws $m' m'$ and with one or more set-screws, $m^2$, adapted to bind said segment against said lips, and with set-screws $m^4 m^4$ upon the leg thereof, adapted to bear against said flanges laterally, and with the slot $s^4$ and the segment $s'$, provided with adjusting set-screws $m' m'$ and one or more set-screws, $m^2$, adapted to bind said segment against said lips, and with a leg, $s^2$, adapted to fit and take a lateral bearing in the slot $s^4$, and the covering-piece $d$, provided with slots $d' d'$, fitted to and taking a lateral bearing upon the other legs of said segments, substantially as described.

9. The combination of the expansion packing-ring $c^3$, the covering-piece $d$, provided with a circumferential slot, $d^3$, and the segment $s$, secured to the packing-ring internally in a radial direction at one part thereof and having a leg, $s^2$, fitted to and taking a lateral bearing in said slot $d^3$ of said covering-piece, substantially as described.

DAVID HALL RICE.

Witnesses:
WILLIAM P. BLAKE,
N. P. OCKINGTON.